US005664252A

United States Patent [19]

Berg et al.

[11] Patent Number: 5,664,252

[45] Date of Patent: Sep. 2, 1997

[54] APPARATUS FOR USE IN OPTIMIZING PHOTOGRAPHIC FILM DEVELOPER APPARATUS

[75] Inventors: Bernard J. Berg, Kentwood; Patrick S. Rood, Walker, both of Mich.

[73] Assignee: X-Rite, Incorporated, Grandville, Mich.

[21] Appl. No.: 479,429

[22] Filed: Jun. 7, 1995

Related U.S. Application Data

[62] Division of Ser. No. 268,211, Jun. 29, 1994.

[51] Int. Cl.$^6$ .......... G03B 41/00; G03B 13/00

[52] U.S. Cl. .......... 396/563; 396/639; 396/569; 396/570; 250/559.06; 356/443

[58] Field of Search .......... 354/20, 298, 334; 356/443, 444; 430/30, 494, 398–400; 250/251.1, 559.02, 559.06; 396/563, 569, 570, 639

[56] References Cited

U.S. PATENT DOCUMENTS

| | | | |
|---|---|---|---|
| 3,636,851 | 1/1972 | Fürst | 356/202 |
| 3,697,759 | 10/1972 | De Cock | 250/559.02 |
| 3,700,335 | 10/1972 | Seelbinder | 356/201 |
| 3,995,959 | 12/1976 | Shaber | 396/570 |
| 4,235,537 | 11/1980 | Thompson | 396/563 |
| 4,293,211 | 10/1981 | Kaufmann | 396/570 |
| 4,335,956 | 6/1982 | Findeis et al. | 355/27 |
| 4,365,895 | 12/1982 | Shaber et al. | 396/570 |
| 4,464,036 | 8/1984 | Taniguchi et al. | 396/569 |
| 4,508,686 | 4/1985 | Shaber et al. | 356/243 |
| 4,518,234 | 5/1985 | Lamére | 396/563 |
| 4,642,276 | 2/1987 | Burtin | 396/563 |
| 4,700,058 | 10/1987 | Belanger et al. | 250/205 |
| 5,062,714 | 11/1991 | Peterson et al. | 356/406 |
| 5,194,887 | 3/1993 | Farling et al. | 396/569 |
| 5,291,420 | 3/1994 | Matsumoto et al. | 364/525 |
| 5,319,408 | 6/1994 | Shiota | 354/298 |
| 5,353,239 | 10/1994 | Kashiwagi | 364/525 X |
| 5,440,365 | 8/1995 | Gates et al. | 396/570 |
| 5,452,040 | 9/1995 | Nishida et al. | 396/569 |

FOREIGN PATENT DOCUMENTS

| | | | |
|---|---|---|---|
| 636630 | 12/1963 | Belgium | 430/30 |
| 4179960 | 6/1992 | Japan | 354/334 |

OTHER PUBLICATIONS

J. B. Ross, "An Automated Densitometer System for Measurement of Spectral Sensitivity", Journal of Applied Photographic Engineering, vol. 3, No. 4, Fall 1977, pp. 194–198.

*Primary Examiner*—D. Rutledge
*Attorney, Agent, or Firm*—Varnum, Riddering, Schmidt & Howlett LLP

[57] ABSTRACT

To provide a standard for determining an objective level of performance of photographic film developer processes, a production sensitometer, of the type commonly used in the field, is correlated with a high precision, master sensitometer, defined as a standard. Relative exposure values are computed for each step of a step wedge exposed by a production sensitometer with reference to a corresponding step of a step wedge exposed in the master sensitometer. The relative exposure values are recorded and stored in a read-only memory in the production sensitometer. In the field, the steps of a step wedge on a test film strip exposed by the production sensitometer and developed by the developer processor to be tested, are read by a densitometer which uses the stored relative exposure values to compute density values for the test strip correlated to the master sensitometer. The developer processor may then be adjusted such that the developed film will match quality control parameters, e.g. speed index, contrast index, etc., supplied by the film supplier.

7 Claims, 5 Drawing Sheets

| STEP | RELATIVE EXPOSURE VALUES |
|---|---|
| 1 | K1 |
| 2 | K2 |
| 3 | K3 |
| 4 | K4 |
| 5 | K5 |
| 6 | K6 |
| 7 | K7 |
| 8 | K8 |
| 9 | K9 |
| 10 | K10 |
| 11 | K11 |
| 12 | K12 |
| 13 | K13 |
| 14 | K14 |
| 15 | K15 |
| 16 | K16 |
| 17 | K17 |
| 18 | K18 |
| 19 | K19 |
| 20 | K20 |
| 21 | K21 |

*Fig. 5*

APPARATUS FOR USE IN OPTIMIZING PHOTOGRAPHIC FILM DEVELOPER APPARATUS

This is a division of application Ser. No. 08/268,211 filed Jun. 29, 1994.

BACKGROUND OF THE INVENTION

1. Field of the Invention

Invention relates to apparatus for measuring the effectiveness of a photographic developer processes and more particular to apparatus for testing and optimizing the photographic film developing process with respect to a predefined standard.

2. Background Art

In diagnostic radiology, medical practitioners rely on the sensitivity and accuracy of the radiographic image in formulating a medical diagnosis. There are many variables, however, in the production of a radiographic image which can lead to incomplete or improper diagnosis. As in any photographic process, the x-ray image is formed on a light sensitive film by a controlled exposure. Typically, the x-ray sensitive film is an acetate cellulose base film coated with an emulsion of silver halide and gelatin. The film may be placed between a pair of x-ray activated phosphorous screens which are responsive to x-ray energy to emit light of a particular color to enhance exposure of the film.

In diagnostic radiology, an object such as a limb or other portion of the body to be diagnosed is placed between an x-ray tube and the photographic film. As x-rays pass through the object, shadow images of areas of varying density are formed on the photographic film representing bone, tumors, or the like. After the film has been exposed in the x-ray process, it is developed and subsequently interpreted by a medical professional.

Proper x-ray interpretation in the diagnosis process depends, to a large degree, on the accuracy of the finished photograph. The clarity and the visible distinction between various portions of the image depend on the level of energy applied by the x-ray tube as well as on the sensitivity of the film and the characteristics of the film developing process. The exposed film is typically developed in an automatic processing device referred to as a developer processor. There are several variables in the developing process which may change over time and which effect the contrast in the developed film. Such variables include the temperature, the chemistry of liquids in the processor, the speed at which the film is advanced through the processor, and the like.

A problem with the prior art arrangement is that there are no independent standards defining control of automatic film developer processors to ensure the quality of the processed images in medical radiographic films. However, there is an increased awareness of the importance of proper film development and a need for measuring and controlling the process. In current practice, the radiologist or a skilled x-ray technician decides when the processor is operating at a level which is acceptable to produce an image of acceptable clarity. Clarity of the image can often be improved by increasing the level of energy produced by the x-ray tube. However, for the protection of the patient, the level of radiation should be kept to a minimum and maximum allowable energy levels are often specified for the equipment. It is therefore desirable to optimize the film developer processor and, particularly, to be able to define a standard of optimization for the processor.

In a known method of comparing the results of a processor with a previous result, a strip of test film is exposed by means of an instrument known as a sensitometer which includes a stable light source and a transparency-gradient step wedge plate. A typical step wedge plate provides a graduated series of 21 exposed areas ranging from full exposure to essentially no exposure. The test strip is developed in a well-adjusted processor and the density values of the separate exposed areas are measured by a well-known densitometer. These density values and several quality control parameters derived from them, e.g. speed index, base and fog, contrast index, average gradient, are recorded. At a later time, a test film strip is again exposed by means of the sensitometer, developed in the processor, and tested by means of the densitometer. The new densitometer readings are compared with the previously recorded values. If the deviations of any of the parameters exceeds predetermined limits, the cause of the deviation is investigated and, if necessary, the automatic developing processor is adjusted until an acceptable operating level is again reached.

Since process control is used only to maintain an automatic film developer processor at a particular operating level after it has once been determined to be at an acceptable operating level, the primary requirement of the sensitometer is that the instrument provide consistent and repeatable exposure. This is critical because variations in the density values of the test strips are assumed to be caused by variations in the developer processor due to variations in the chemistry, temperature, feed rate, etc. A tight inter-instrument agreement specification between sensitometers is not required since the control of any one automatic film developer processor is specific to the sensitometer used in setting up the processor.

A well known Density versus Relative Log Exposure curve is depicted in FIG. 1. This curve is derived from density readings from the steps of a step wedge exposed film. Density values are plotted along the abscissa and relative log exposure values are plotted along the axis. The Straightest portion of the curve is in the area corresponding to step 11 of the step wedge. Readings in this area are typically chosen to compute the contrast index, speed index, and other parameters. The computations are based on the assumption that the curve varies regularly over a distance covering several steps and that the level of exposure of a step varies by a factor of 1.4125 ($\sqrt{2}$) from adjacent steps. Thus, on the relative log exposure scale adjacent steps are separated by log $\sqrt{2}=0.150$. Inaccuracies, however, are introduced since, in actual practice, the steps do not vary regularly in $\sqrt{2}$ increments. This may be due to variations in tolerances in the step wedge filter used in the sensitometer as well as variations in illumination over the lengths of the step wedge in the sensitometer. Thus, indices computed on the basis of readings from a number of wedge steps have inherent inaccuracies.

In the continuing effort to provide the best possible image quality while minimizing the level of x-ray radiation to which a patient is exposed, an effort is currently underway to allow processors to be optimized for specific radiographic film and specific developer chemistry. Thus, it is desirable to provide x-ray equipment operators with the tools and information required to obtain optimum film performance for a specific film/chemistry/processor combination.

SUMMARY OF THE INVENTION

These and other problems of the prior art are solved in accordance with the principle of this invention by developer processor optimization instrumentation which, when used in association with predefined quality control parameters provided by the film manufacturer, will provide a measure of performance of the developer processor relative to the predefined quality control parameters provided by the film manufacturer. The processor optimization instrumentation includes a sensitometer for exposing a test filter strip and a densitometer for measuring the density of the exposed film after it has been developed in the developer processor to be optimized. In accordance with the invention, a production sensitometer designated for field use, is calibrated with respect to a master sensitometer, defined as a standard, by recording data indicative of deviation of the production sensitometer from the master sensitometer at a plurality of exposure levels. When the production sensitometer is used in the field, the density readings of a test strip exposed by the production sensitometer are used in conjunction with the data recorded for that production sensitometer to derive density readings correlated to the master sensitometer. Advantageously, the instrumentation of this invention provides a reliable indication of the performance of a developer processor relative to standard control parameters for a specified film and developer chemistry.

In one embodiment on the invention, a precision built master sensitometer, defined as a standard, is used to expose a step wedge along one edge of a strip of film from a known film batch. A step wedge is also exposed along the other edge of the same strip of film in a production sensitometer. The film strip is then developed in an automatic developing processor using a known chemistry. Because the two separately exposed edges of a single piece of film are developed simultaneously in the same processor, density differences between the two exposed edges of the film are assumed to be due to differences in the characteristics of the two sensitometers in which the edges were separately exposed. The Density of the two exposed edges of the film are measured separately in a densitometer. The results from the two separate densitometer readings are used to generate data representing a correlation between the master and the production sensitometer. The recorded data accompanies the production sensitometer and is used in the field to provide density measurements correlated to the master sensitometer In one embodiment of the invention, the densitometer readings obtained from various steps of a step wedge exposed in the master sensitometer are used to define a Density versus Relative Log Exposure curve (D Log E curve) similar to the curve shown in FIG. 1. The master sensitometer is a relatively expensive, high precision device designed such that the steps of a step wedge exposed in the master sensitometer vary from adjacent steps by a value which is substantially equal to $^{\circ}\sqrt{2}$. Accordingly, the log exposure values for such a step wedge are multiples of 0.150 along the axis of the Density versus Relative Log Exposure curve (D Log E curve). A production sensitometer is preferably a less expensive device and does not have the accuracy of the master device. As a consequence, the log exposure values on a D Log E curve for the production device typically are not exact multiples of 0.150. In accordance with this invention, a production sensitometer is calibrated such that the log exposure values for a production sensitometer are correlated to the master instrument. A first step in calibrating the production instrument to the master is to adjust the light source in the production instrument such that the density at step 11 of a step wedge exposed in the production sensitometer is equal to the density at step 11 of a step wedge exposed in the master sensitometer. For all other steps of the step wedge exposed in the production sensitometer, the density readings are compared with the curve for the master sensitometer. For each step other than step 11, the relative log exposure value on the master curve corresponding to the density reading obtained from the step wedge exposed in the production sensitometer is recorded as a relative log exposure value. When the production sensitometer is used in the field in testing or optimizing a developer process, a step wedge is exposed on a test film strip in the production sensitometer. The test film strip is developed in the developer process to be optimized and the density of the steps of the step wedge of the developed film is read by a densitometer. The densitometer, in accordance with the principles of this invention, is provided with a processor which generates a D Log E curve for the exposed test strip using the density values read from the test strip and the relative exposure values recorded for the production sensitometer in the calibration of the production sensitometer. Correlated density values for each of the steps of the exposed step wedge, correlated to the master sensitometer, are obtained by deriving a density value from the D Log E curve for the test strip at relative log exposure values which are exact multiples of 0.150.

In one specific embodiment of the invention, the relative log exposure values derived in the process of calibrating the production sensitometer are stored in a read-only memory in the production sensitometer. The densitometer, which is connected to the read-only memory in the sensitometer, reads the relative exposure values and uses these values as points on the horizontal axis in deriving the D Log E curve for the test strip. The densitometer generates relative density outputs for the steps of the step wedge, developed on the test strip by the developer process being tested, correlated to the master sensitometer by obtaining the density values from the derived D Log E curve corresponding to an exact multiple of 0.150 for each step of the step wedge. Thus, in accordance with this invention an objective standard for developer processor optimization is provided by the use of a reasonably priced, portable sensitometer correlated to a high precision standardized instrument.

BRIEF DESCRIPTION OF THE DRAWING

A preferred embodiment of the invention is described with reference to the drawing wherein:

FIG. 5 is a table of relative exposure values stored in the memory of the sensitometer of FIG. 4.

DETAILED DESCRIPTION

Figure 1:
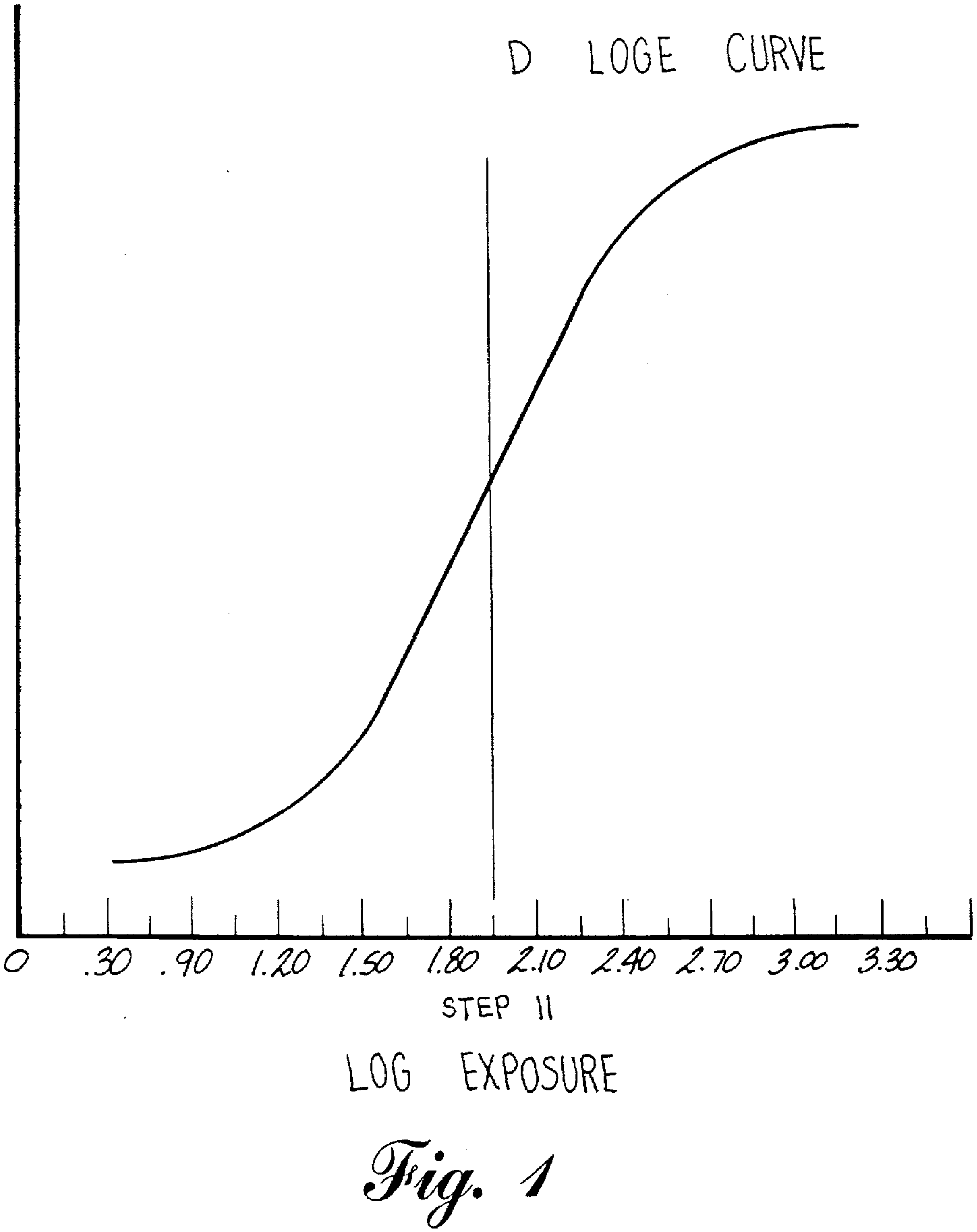
FIG. 1 represents a known Density versus Relative Log Exposure curve for a step wedge sensitometer.

FIG. 1 is a representation of a typical Density versus Relative Log Exposure (D Log E) curve which represents a typical film response curve in relating density and exposure. The ordinate of FIG. 1 represents density and the abscissa represents the log of exposure values at each of 21 steps of a standard 21 step wedge. For one known and commonly used type of step wedge the exposure of a step varies by a factor of 1.4125 from each adjacent step, as follows: $E_{n+1}=1.4125\ E_n$ or $LOG(E_{n+1})-LOG(E_n)=LOG(E_{n+1}/E_n)=0.150$ where $E_n$ is the relative exposure of step n and $E_{n+1}$ is the relative exposure of step n+1. Accordingly, the points on the abscissa of FIG. 1 are separated by 0.150.

Figure 2:
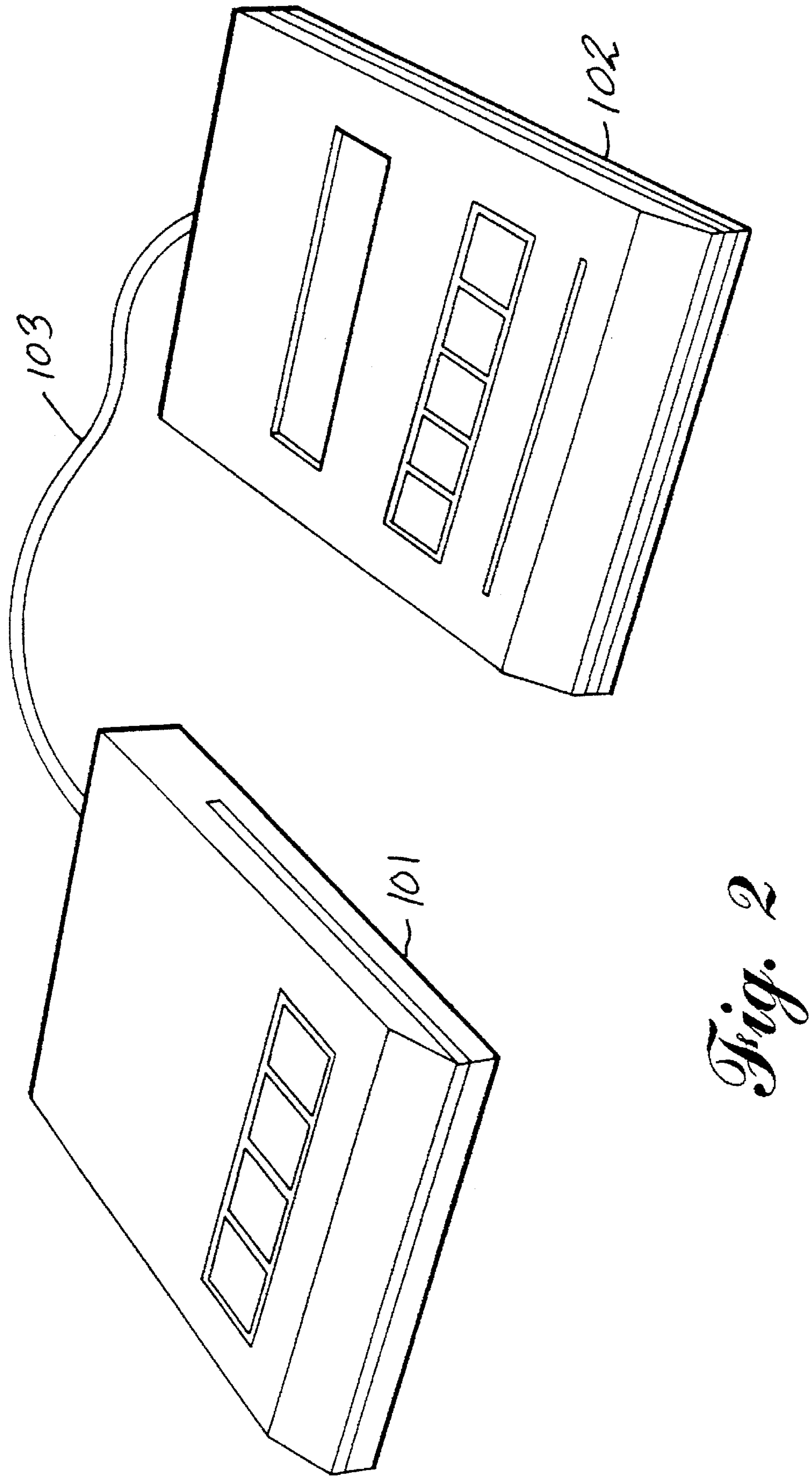
FIG. 2 is a diagrammatic representation of a sensitometer/densitometer arrangement incorporating principles of the invention.
Figure 3:
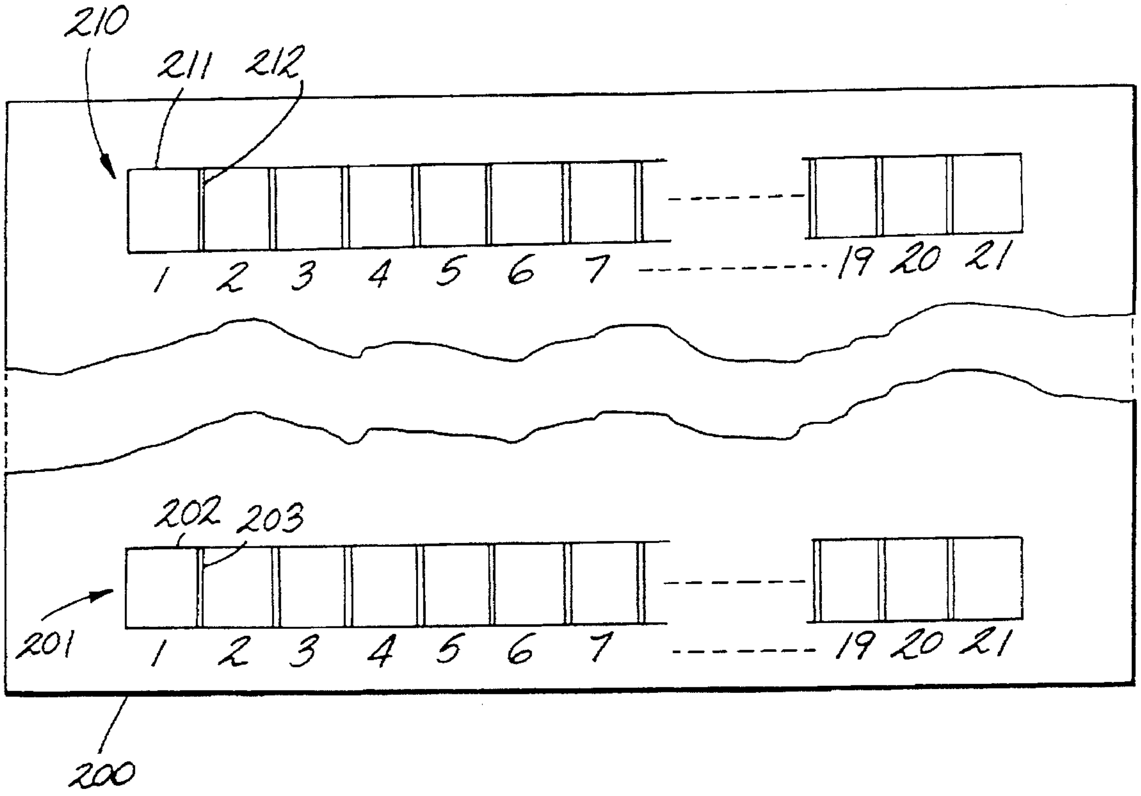
FIG. 3 is a representation of a test film strip having exposed step wedges along opposite edges.
Figure 4:
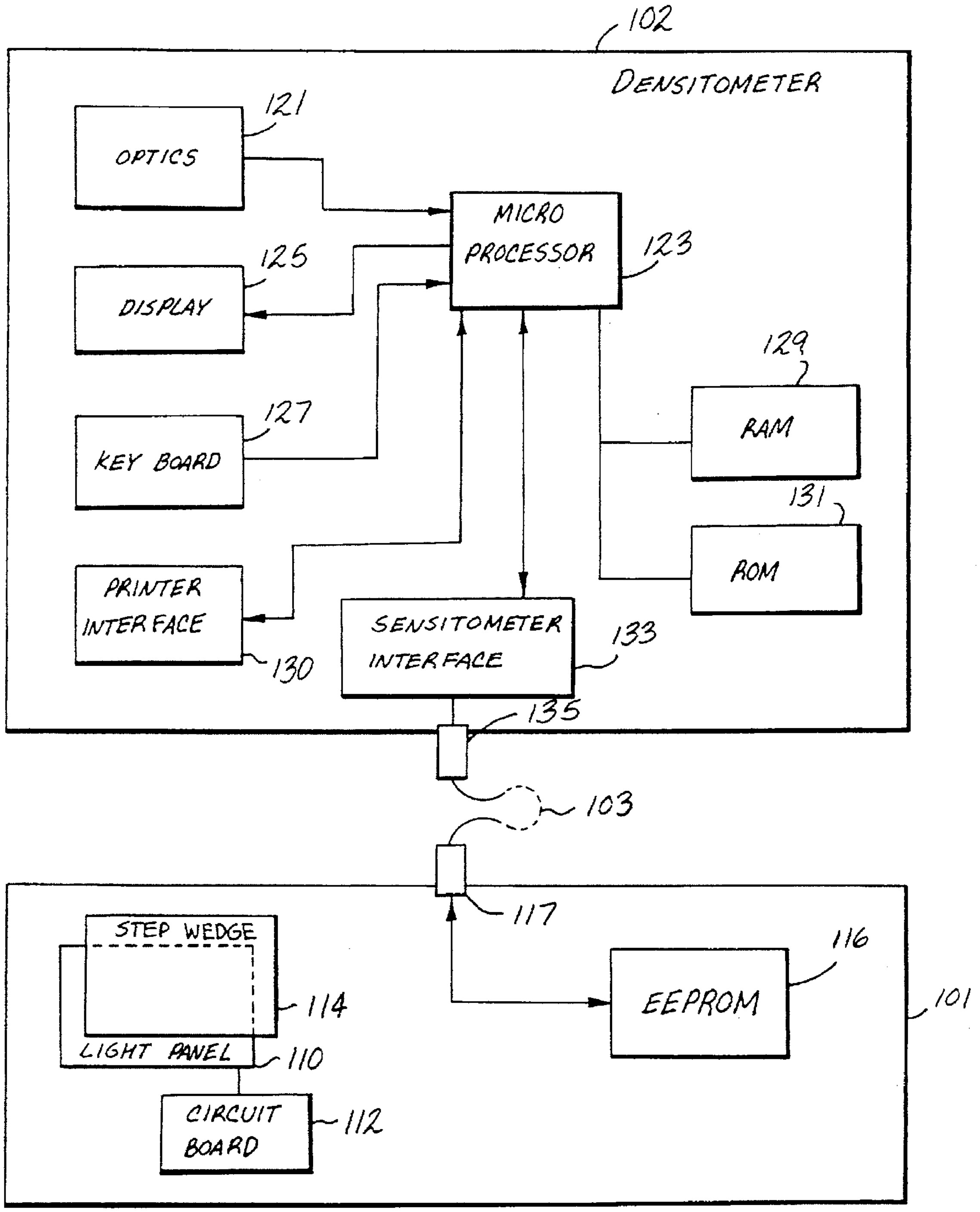
FIG. 4 is a block diagram representation of relevant portions of the sensitometer/densitometer arrangement of FIG. 2.

A typical method for evaluating the performance of a film developer processor includes exposing a test film strip by means of a sensitometer which provides a step wedge of light causing exposure of various intensities of adjacent areas of the film. The film is then developed in the developer processor and the optical density of each of the various exposed step wedge areas is measured by a densitometer. FIG. 2 shows a sensitometer 101 connected to a densitometer 102 by cable 103. FIG. 3 shows a strip of film 200 having a step wedge of exposed areas. FIG. 4 is a block diagram representation of the sensitometer 101 and the densitometer 102. Sensitometers, like densitometers, are well known devices. Their primary function is to provide a consistent level of exposure for test purposes, as described in the previous paragraphs. One type of prior art sensitometer is described in U.S. Pat. No. 4,235,537 issued Nov. 25, 1980 and entitled Method of Testing Photographic Film Using Multi-color Sensitometer. As shown in FIG. 4, sensitometer 101, includes an electroluminescent light panel 110 which emits light energy in response to application of an alternating current, in a well known fashion. Further included within the sensitometer 101 is a step wedge plate 114 disposed adjacent light panel 110. Wedge plate 114 is a commercially available device which provides the step wedge exposure comprising 21 steps on a film strip. As depicted in FIG. 3, the film strip 200 comprises strip 201 having a series of 21 exposed areas or steps 202 separated by divider areas 203. In an ideal sensitometer, the difference in exposure level between adjacent exposed steps will be exactly to log $\sqrt{2}$ and exposure can be expressed a multiple of log $\sqrt{2}$. However, due to variations in electroluminescent light panels and variations in the step wedge plate in the sensitometer, and exposure levels, particularly in relatively inexpensive production instruments, exposure levels are not exactly equal to multiples of log $\sqrt{2}$. In accordance with the present invention, a precision sensitometer, designated as the master sensitometer, is built employing a high precision step wedge plate and is provided with controlled illumination such that the exposure difference between adjacent steps of the exposed step wedge is, as nearly as reasonably possible, equal to log $\sqrt{2}$. Production sensitometers are calibrated with reference to this master sensitometer. Relative exposure values are computed for each step of the step wedge to correlate the production sensitometer with the master sensitometer.

A first step in the sensitometer calibration procedure, in accordance with this invention, is to adjust a production sensitometer such that the exposure at step 11 corresponds to that of the master sensitometer at step 11. The exposure level in the production sensitometer may be adjusted by means of a timing circuit which controls the period that the panel is illuminated and responds to each activation of the instrument. FIG. 4 shows a circuit board 112 which may include connections to a standard power source (not shown) and a potentiometer which may be part of the timing circuit for adjusting exposure time. The circuit board may include other standard circuit elements as well. To determine whether a correct adjustment has been made, a test strip is exposed along one edge in the master sensitometer and along another edge in the production sensitometer and developed. The density at step 11 for both strips is then read in a densitometer and further adjustments may be made if the two readings do not match. After step 11 of the production sensitometer has been adjusted to match that of the master sensitometer, a test strip is exposed along opposite edges in the master sensitometer and the production sensitometer and again developed. The film strip 200 represented in FIG. 3 shows a strip 210 of exposed areas 211 separated from each other by divider strips 212 as well as a strip 201 showing exposed areas 202 separated by divider strips 203. Byway of example, the strip 210 may have been exposed by the master sensitometer and the strip 201 by the production sensitometer.

FIG. 4 further shows a block diagram representation of a densitometer 102. Densitometers are well known in the art. One prior art densitometer is described in U.S. Pat. No. 5,062,714 issued Nov. 5, 1991 entitled "Apparatus and Method for Pattern Recognition." The densitometer 120 includes optics, represented by block 121, used for the detection of light transmitted through an object sample. Standard electro-optical devices which provide electrical signals indicative of received light are included in the optics 121. Electrical signals corresponding to received light are transmitted to a microprocessor 123 which is programmed to compute color density indicia from the electrical signals corresponding to the received light. The densitometer typically includes a display represented by block 125 and a keyboard represented by block 127. If desired, the densitometer may also be connected to a printer in a standard fashion to print out density values, for example, for each of the 21 steps of the step wedge. Associated with the microprocessor 123 is a random access memory 129 generally used for data storage and a read-only memory 131 generally used for storage of programs and permanent data. Densitometer 102 may be a device such as described in the aforementioned U.S. Pat. No. 5,062,714 wherein the strip to be evaluated is advanced through the densitometer at a constant speed and wherein a specific pattern, such as the strip 201 shown in FIG. 2 of exposed individual steps 202 separated by a divider 203 is readily identified. As mentioned earlier, the exposed steps 1–21 typically range from transparent to essentially opaque. The steps in the more nearly transparent portion of the step wedge may be separated by opaque separators 203, 212 and steps in the more opaque portion of the step wedge may be separated by clear strips 203, 212, to aid in pattern recognition. In certain commercially available densitometers, the internal processor 123 has curve fitting capabilities using such well known techniques as Cubic Spline or LaGrange curve fitting techniques. In the calibration procedure, the densitometer 102 is first used to read the density values of each of the 21 steps of the strip 210 exposed in the master sensitometer. By means of the curve fitting capability, the densitometer 102 derives a D Log E curve for the strip exposed in the master sensitometer. For the master sensitometer, the relative log exposure values are taken to be exact multiples of 0.15, as depicted in FIG. 1. Thus, the curve is defined by the obtained density values plotted relative to each of the relative log exposure values. A definition of this curve is stored in the densitometer 102. The strip 201 developed in the production sensitometer to be calibrated is also measured in densitometer 102 and the density values for each of the 21 steps are recorded. For each of the density values obtained from the strip 201, a reference is made to the recorded D Log E curve for the strip exposed in the master sensitometer, referred to herein as the master D Log E curve. For each such density value referenced to the master D Log E curve, the corresponding relative log exposure value is recorded. At step 11, the relative log exposure value should be a multiple of 0.15 since the production sensitometer was adjusted to the master sensitometer at this step. For other steps, the relative log exposure value corresponding to the density reading obtained for the production sensitometer may well not be a multiple of 0.15. Therefore, this number is recorded for later use when the production sensitometer is used in the field.

Referring again to FIG. 4, the sensitometer 101 includes a read-only memory 116 which may, for example, be an electrically erasable, programmable, read-only memory ("EEPROM"). The relative exposure values computed by the densitometer 102 by reference to the D Log E curve for the master sensitometer are preferably stored in the read-only memory 116 of the sensitometer 101. FIG. 5 is a tabular representation of values $K_1$ through $K_{21}$, corresponding to the relative log exposure values for steps 1 through 21.

As can be seen with reference to FIG. 1, the typical D Log E curve becomes nearly flat as the extremities of the step wedge are approached, indicating that a step change in relative log exposure does not result in any significant change in optical density at the extremities. For most radiographic films, visible range, or the range in which changes in density are discernable to the human eye, is limited to approximately seven steps on either side of step 11. Thus, changes in exposure beyond those steps are typically not of interest. Furthermore, since any error in density reading, which may be in part due to imperfections in the film or in the developer process, may result in large changes in the relative log exposure values for those densities, readings from the production sensitometer near the extremities of the curve may be ignored or assumed to be the same as for the master sensitometer.

When the production sensitometer is used in the field, a densitometer such as densitometer 102 may be connected to sensitometer 101 and read from the memory 116 the relative exposure values recorded in the memory at the time that the sensitometer 101 was calibrated. The process of calibrating or testing a developer processor using sensitometer and densitometer instruments in accordance with the invention, includes exposing a test film strip in the sensitometer 101 and developing that test film strip in the developer process to be calibrated. Thereafter the developed step wedge is read in the densitometer 102. The density values obtained from the individual steps of the exposed step wedge on the test film strip are temporarily stored, for example in the random access memory 129. Additionally, the microprocessor 123 is programmed to access the memory 116 in the sensitometer 101 to obtain relative exposure values recorded there for that particular sensitometer. The microprocessor 123 accesses the memory 116 by generating the necessary memory address for the memory 116 and transmitting them to the RS232 interface 133. The address information is converted to the RS232 format and transmitted to the RS232 interface 118 in the sensitometer 101. The interface 118 converts the transmitted signals to memory address signals which are applied to the memory 116. In a similar fashion, data read from the memory 116 is transferred to the microprocessor 123. As mentioned earlier, the microprocessor 123 is provided with curve fitting capabilities based on standard curve fitting techniques. The microprocess 123 defines a D Log E curve for the test strip developed in the developer process to be calibrated by using the relative exposure values obtained from the sensitometer to define the abscissa and uses the obtained density values to define the ordinate for each of the points of the curve corresponding to a step of the step wedge. Thereafter, the processor defines points on the D log E curve for the test strip which correspond to the exact multiples of 0.15 at each of the steps. The corresponding density values are recorded and may be displayed as correlated density values, That is, density values correlated to the master sensitometer. The density values at the steps adjacent to step 11 are used to compute quality factors such as speed index, contrast index and other parameters. A technician may compare these values with corresponding values provided by the film manufacturer and adjust the developer process accordingly. Since the production sensitometer used in the field provides readings which are correlated to a high precision sensitometer, an objective level of performance of the developer process is defined on the basis of a known level of exposure and known film characteristics.

Different film types, having different characteristics and therefore different D Log E curves may be used for different purposes. For example, different film type may be used in an x-ray of a bone member in the human body than in an area of the body consisting essentially only of tissue. The sensitometer 101 may be provided with a number of tables, each corresponding to a different type of film and the sensitometer 102 may be provided with switches or other input devices which would indicate the type of film used and define the identity of the table to be addressed in the sensitometer 101.

It will be understood that the above described implementation is merely illustrative of the application of the principals of the invention and that other arrangements may be devised by those skilled in the art without departing from the spirit and scope of the invention.

What is claimed is:

1. In combination:

sensitometer apparatus comprising an illumination device, the sensitometer apparatus providing a level of exposure for each of a plurality of areas on a photographic film exposed in the sensitometer apparatus;

a memory storing data defining a relative exposure value for each of the plurality of areas exposed by the sensitometer, each relative exposure value representing a deviation of the level of exposure provided by the sensitometer for a selected area from a predefined standard level of exposure for the selected area;

densitometer apparatus comprising optical measuring apparatus providing electrical signals representative of optical density of each measured area of exposed film and a programmable processor connected to the memory and responsive to the electrical signals to compute measured density values for the areas of exposed film;

the processor programmed to read the data defining the relative exposure values from the memory and to compute a correlated density value for each of the areas of exposed film by combining the data read from the memory with the measured density values.

2. The combination in accordance with claim 1 wherein the sensitometer apparatus comprises a multiple step transparency-gradient step wedge plate and the sensitometer provides a predefined level of exposure corresponding to each step of the step wedge plate and provides a predefined level of exposure for each step of the step wedge plate and produces a step wedge on the exposed area of a photographic film inserted in the densitometer apparatus and wherein the memory stores data defining a relative exposure value for each area of the step wedge of exposure, and the processor is further operative to generate data defining a density versus log exposure curve for the exposed film using values representative of the optical density of each measured area as density values of the curve and using predefined relative log exposure values for the curve corresponding to each measured area.

3. The apparatus in accordance with claim 2, wherein the processor is further operative to obtain from the curve correlated density values corresponding to relative log exposure values which are exact multiples of 0.15.

4. The apparatus in accordance with claim 1 wherein the sensitometer apparatus is contained within a sensitometer housing and the memory is also contained in the sensitometer housing.

5. The apparatus in accordance with claim 4 and further comprising a first interface circuit connected to the memory and a second interface circuit connected to the programmable processor and further comprising a cable interconnecting the first and second interface circuits, whereby the memory in the sensitometer housing may be accessed from the densitometer apparatus programmable processor.

6. The combination in accordance with claim 1 wherein each predefined standard level of exposure for a corresponding area is defined relative to a level of exposure provided by a high precision sensitometer for the corresponding area.

7. Portable apparatus for testing performance of photographic film developer processors in a field environment comprising:

a portable sensitometer for use in field installations, the portable sensitometer operative to expose test portions of film exposed in a film developer and comprising a light source and a transparency-gradient step wedge plate disposed adjacent the light source, the step wedge plate having a graduated series of exposed areas;

the sensitometer operative to provide on a photographic film exposed in the sensitometer a step wedge exposure comprising a plurality of exposed areas corresponding to the plurality of exposed areas in the wedge plate;

a memory storing data defining a relative exposure value for each of the plurality of exposed areas, each relative exposure value representing a deviation of the level of exposure for a selected exposed area from a predefined standard level of exposure for the selected exposed area, the deviation from the predefined standard level of exposure for each exposed area being determined by comparison of a level of exposure provided by each exposed area of the portable sensitometer compared to a level of exposure of a corresponding area provided by a high precision standard sensitometer; and densitometer apparatus comprising optical measuring apparatus providing electrical signals representative of optical density of each measured area of exposed film and a programmable processor connected to the memory and responsive to the electrical signals to compute measured density values for the areas of exposed film;

the processor programmed to read the data defining relative exposure values from the memory and to compute a correlated density value for each of the areas of film exposed in the sensitometer by combining the data read from the memory with density values obtained by measuring the areas of film exposed in the sensitometer.

* * * * *